United States Patent
Weber-Grabau et al.

(10) Patent No.: US 7,430,898 B1
(45) Date of Patent: Oct. 7, 2008

(54) METHODS AND SYSTEMS FOR ANALYZING A SPECIMEN USING ATOMIC FORCE MICROSCOPY PROFILING IN COMBINATION WITH AN OPTICAL TECHNIQUE

(75) Inventors: Michael Weber-Grabau, Sunnyvale, CA (US); Christopher F. Bevis, Los Gatos, CA (US); Michael Faeyrman, Qyriat Motzkin (IL); Ofir Zamir, Haifa (IL)

(73) Assignee: KLA-Tencor Technologies Corp., Milpitas, CA (US)

(*) Notice: Subject to any disclaimer, the term of this patent is extended or adjusted under 35 U.S.C. 154(b) by 485 days.

(21) Appl. No.: 10/934,786

(22) Filed: Sep. 3, 2004

Related U.S. Application Data

(60) Provisional application No. 60/500,162, filed on Sep. 4, 2003.

(51) Int. Cl.
   *G01B 5/28* (2006.01)
   *G01N 13/16* (2006.01)
(52) U.S. Cl. .................. 73/105; 977/851; 977/863; 977/868; 977/869; 977/881
(58) Field of Classification Search .................. 73/105; 250/306; 977/849, 850, 851, 860, 863, 868, 977/869, 881
   See application file for complete search history.

(56) References Cited

U.S. PATENT DOCUMENTS

| | | | |
|---|---|---|---|
| 4,818,110 A | 4/1989 | Davidson | |
| 5,112,129 A | 5/1992 | Davidson et al. | |
| 5,438,413 A | 8/1995 | Mazor et al. | |
| 5,650,614 A * | 7/1997 | Yasutake et al. | 250/234 |
| 5,811,796 A | 9/1998 | Marchman et al. | |
| 5,889,593 A | 3/1999 | Bareket | |
| 5,917,594 A | 6/1999 | Norton | |

(Continued)

FOREIGN PATENT DOCUMENTS

WO 99/45340 9/1999

(Continued)

OTHER PUBLICATIONS

Diebold, *Handbook of Silicon Semiconductor Metrology*, © 2001 by Marcel Dekker, Inc., pp. 342-343.

(Continued)

*Primary Examiner*—Daniel S Larkin
(74) *Attorney, Agent, or Firm*—Baker & McKenzie LLP

(57) ABSTRACT

A system that includes an optical subsystem and an atomic force microscope probe is provided. The optical subsystem is configured to generate positional information about a location on a surface of the specimen. The system is configured to position the probe proximate the location based on the positional information. One method includes generating positional information about a location on a surface of a specimen with an optical subsystem. The method also includes positioning an atomic force microscopy probe proximate the location based on the positional information. Another system includes an optical subsystem configured to measure overlay of a wafer using scatterometry. The system also includes an atomic force microscope configured to measure a characteristic of a feature on the wafer. An additional method includes measuring overlay of a wafer using scatterometry. The method also includes measuring a characteristic of a feature on the wafer using atomic force microscopy.

16 Claims, 5 Drawing Sheets

U.S. PATENT DOCUMENTS

| | | | |
|---|---|---|---|
| 5,955,661 A | 9/1999 | Samsavar et al. | 73/105 |
| 6,435,015 B1 * | 8/2002 | Yamamoto | 73/105 |
| 6,529,621 B1 | 3/2003 | Glasser et al. | |
| 6,552,331 B2 * | 4/2003 | Rotsch | 250/234 |
| 6,633,831 B2 * | 10/2003 | Nikoonahad et al. | 702/155 |
| 2002/0018217 A1 | 2/2002 | Weber-Grabau et al. | |
| 2002/0158197 A1 * | 10/2002 | Dana et al. | 250/306 |
| 2006/0185424 A1 * | 8/2006 | Muckenhirn | 73/105 |

FOREIGN PATENT DOCUMENTS

| | | |
|---|---|---|
| WO | 00/36525 | 6/2000 |
| WO | 02/15238 | 2/2002 |
| WO | 02/25723 | 3/2002 |

OTHER PUBLICATIONS

Raymond et al., "Scatterometry for CD measurements of etched structures," SPIE vol. 2725, 1996, pp. 720-728.

Sturtevant et al., "Use of scatterometric latent image detector in closed loop feedback control of linewidth," SPIE vol. 2196, 1994, pp. 352-359.

* cited by examiner

METHODS AND SYSTEMS FOR ANALYZING A SPECIMEN USING ATOMIC FORCE MICROSCOPY PROFILING IN COMBINATION WITH AN OPTICAL TECHNIQUE

PRIORITY CLAIM

This application claims priority to U.S. Provisional Application No. 60/500,162 entitled "Methods and Systems for Analyzing a Specimen Using Atomic Force Microscopy Profiling in Combination with an Optical Technique," filed Sep. 4, 2003, which is incorporated by reference as if fully set forth herein.

BACKGROUND OF THE INVENTION

1. Field of the Invention

The present invention generally relates to methods and systems for analyzing a specimen using atomic force microscopy profiling in combination with an optical technique. Certain embodiments relate to systems and methods for positioning an atomic force microscope probe based on data generated by an optical subsystem.

2. Description of the Related Art

The following description and examples are not admitted to be prior art by virtue of their inclusion in this section.

Fabricating semiconductor devices such as logic and memory devices typically includes processing a specimen such as a semiconductor wafer using a number of semiconductor fabrication processes to form various features and multiple levels of the semiconductor devices. For example, lithography is a semiconductor fabrication process that typically involves transferring a pattern to a resist arranged on a semiconductor wafer. Additional examples of semiconductor fabrication processes include, but are not limited to, chemical-mechanical polishing, etch, deposition, and ion implantation. Multiple semiconductor devices may be fabricated in an arrangement on a semiconductor wafer and then separated into individual semiconductor devices.

As the dimensions of advanced semiconductor devices continue to shrink, metrology and inspection processes used to monitor and control semiconductor fabrication processes are becoming increasingly important and increasingly difficult. For example, in the past, critical dimension (CD) metrology was mostly performed with optical or electron microscopes. However, as the aspect ratio, which is generally defined as the height of a feature divided by its width, of integrated circuit features increases, measuring characteristics of the features in all three dimensions becomes more important and more difficult. Scanning probe microscopes (SPMs) are an attractive alternative to optical and electron microscopes for three-dimensional imaging of integrated circuit features. In addition, many SPMs are capable of atomic-scale resolution for a wide range of materials, even in ambient conditions.

Unlike optical and electron microscopes, SPMs do not use optics or electrons to obtain images. Instead, SPMs use a solid body (i.e., a probe tip) to perform measurements. In general, the probe tip is brought into close proximity with a specimen, and the probe tip is scanned back and forth in a raster fashion. The probe traverses the specimen at a constant distance from the specimen. By monitoring the displacement of the probe during scanning, a three-dimensional image of the specimen may be obtained. In this manner, a high resolution image of the specimen in all three dimensions may be achieved. An additional advantage of SPMs is that specimens can be imaged in a non-destructive manner.

One example of an SPM is an atomic force microscope (AFM). Force sensors are the most commonly used type of sensors for detection of the proximity of the probe tip to the specimen surface. For example, semiconductor manufacturing specimens often have poorly conducting or poorly insulating properties. In addition, force sensors are able to profile all regions of such specimens uniformly. Therefore, one main advantage of an AFM is that insulating samples as well as conductive samples may be imaged.

There are, however, some disadvantages to an AFM. For example, an AFM generally has a relatively low throughput. The relatively low throughput is due, at least in part, to the need to protect the probe tip from damage. Therefore, the AFM probe may not be scanned over the surface faster than its ability to respond to changes in surface height to avoid collisions between the AFM probe tip and the specimen surface. The throughput is low enough to prevent an AFM from being used as an in-line metrology tool for semiconductor device manufacturing. In addition, optical and electron microscopes are much faster than AFMs making these microscopes the metrology choice for in-line measurements.

In addition to slow imaging times, finding the features to be imaged with an AFM is also relatively time consuming. For example, the physical structure of most probe microscopes excludes high-magnification viewing of the probe tip on the specimen surface. In addition, micro-cantilever based AFMs may physically prevent the surface region of interest from being viewed. Therefore, the probe tip cannot be imaged near the surface region of interest, and surface features of interest must be found by imaging with the probe tip at relatively slow speed with a limited field of view. In most instances, the majority of probe tip wear is encountered during this imaging step.

Accordingly, it may be advantageous to increase the throughput of SPMs, and in particular AFMs, by decreasing the time required to position the probe tip prior to scanning thereby reducing damage caused to the probe tip during positioning of the AFM and improving the suitability of such microscopes for use as in-line measurement tools.

SUMMARY OF THE INVENTION

An embodiment of the invention relates to a system that includes an optical subsystem and an atomic force microscopy probe. The optical subsystem is configured to generate positional information about a location on a surface of a specimen. The system is configured to position the probe proximate the location based on the positional information. For example, in some embodiments, the system may include a servo subsystem configured to receive the positional information from the optical subsystem. The servo subsystem may also be configured to move the probe to the location based on the positional information.

The positional information may include x and y coordinates of the location. In some embodiments, the positional information may include a z position of the probe based on three-dimensional information about the surface of the specimen. In one embodiment, the optical subsystem may be configured to generate three-dimensional information about the location on the surface of the specimen. In such an embodiment, the system may be configured to position the probe a spaced distance from the location on the surface of the specimen based on the three-dimensional information.

In one embodiment, the optical subsystem and the probe may be arranged within one housing. In a different embodiment, the optical subsystem and the probe may be coupled by a transmission medium.

In another embodiment, the optical subsystem may be configured to generate images of the surface of the specimen. The system may include a graphical user interface that may be configured to display the images. The system may also include a user input device. A user may use the user input device to select the location on the surface of the specimen based on the images displayed on the graphical user interface.

In one embodiment, the optical subsystem may include a coherence probe microscope. In another embodiment, the optical subsystem may include an inspection system. In one such embodiment, the location may correspond to a location of a defect detected on the surface of the specimen by the inspection system. In an additional embodiment, the optical subsystem may include a defect review system. In such an embodiment, the location may correspond to a location of a defect identified by the defect review system for analysis with the probe. In yet another embodiment, the optical subsystem may include a defect dispositioning system. The system may be further configured as described herein.

Another embodiment relates to a method that includes generating positional information about a location on a surface of a specimen with an optical subsystem. The method also includes positioning an atomic force microscopy probe proximate the location based on the positional information. In one embodiment, the method may include generating three-dimensional information about the location on the surface of the specimen with the optical subsystem. Such an embodiment may also include positioning the probe a spaced distance from the location on the surface of the specimen based on the three-dimensional information. In another embodiment, the positional information may include a z position for the probe based on three-dimensional information about the surface of the specimen.

In an additional embodiment, the method may include generating images of the surface of the specimen with the optical subsystem. In such an embodiment, the method may also include displaying the images to a user such that the user can select the location using the images. In another embodiment, the method may include inspecting the specimen with the optical subsystem. The location may correspond to a location of a defect detected on the specimen. In a different embodiment, the method may include reviewing defects detected on the specimen with the optical subsystem. In one such embodiment, the location may correspond to a location of one of the defects identified for further analysis with the probe. The method may also include any other step(s) described herein.

An additional embodiment relates to a system that includes an optical subsystem and an atomic force microscope. The optical subsystem is configured to measure overlay of a wafer using scatterometry. Overlay is a measure of misalignment between patterned features located on different layers of the wafer. The atomic force microscope is configured to measure a characteristic of a feature on the wafer. In one embodiment, the feature may be one of the patterned features. In another embodiment, the microscope may be configured to measure the characteristic of each of the patterned features located on each of the different layers. In some embodiments, the characteristic of the feature may be a characteristic of a portion of the feature.

In one embodiment, the feature may be located at a first position on the wafer. In one such embodiment, the optical subsystem may be configured to measure the overlay at a second position on the wafer spaced from the first position. In another such embodiment, the microscope may be configured to measure the characteristic of the feature at the first position while the optical subsystem measures the overlay at the second position.

In some embodiments, the system may be configured to alter the overlay measured by the optical subsystem using the characteristic measured by the microscope. In additional embodiments, the system may be configured to validate the overlay measured by the optical subsystem using the characteristic measured by the microscope.

In one embodiment, the optical subsystem and the microscope may be arranged within one housing. In a different embodiment, the optical subsystem and the microscope may be arranged within different housings. The system may be further configured as described herein.

Another embodiment relates to a method that includes measuring overlay of a wafer using scatterometry. Overlay is a measure of misalignment between patterned features located on different layers of the wafer. The method also includes measuring a characteristic of a feature on the wafer using atomic force microscopy. In one embodiment, the feature may be one of the patterned features. In another embodiment, atomic force microscopy may be used to measure the characteristic of each of the patterned features located on each of the different layers. In some embodiments, the characteristic of the feature may be a characteristic of a portion of the feature.

In one embodiment, the feature may be located at a first position on the wafer. In one such embodiment, the method may include measuring the overlay at a second position on the wafer spaced from the first position. In another such embodiment, the method may include measuring the characteristic of the feature at the first position while measuring the overlay at the second position.

In some embodiments, the method may also include altering the overlay measurement using the characteristic. In additional embodiments, the method may include validating the overlay measurement using the characteristic. The method may also include any other step(s) described herein.

An additional embodiment relates to a method that includes measuring overlay of a wafer using an atomic force microscope. Overlay is a measure of misalignment between patterned features located on different layers of the wafer. The method also includes measuring a characteristic of at least one of the patterned features on the wafer using the atomic force microscope. The method may also include any other step(s) described herein.

BRIEF DESCRIPTION OF THE DRAWINGS

Further advantages of the present invention may become apparent to those skilled in the art with the benefit of the following detailed description of the preferred embodiments and upon reference to the accompanying drawings in which.

Figure 1:
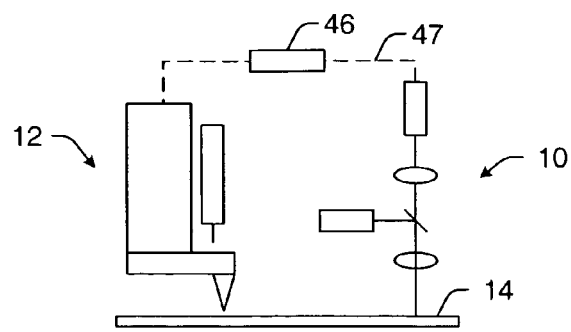
FIG. 1 is a schematic diagram illustrating a side view of one embodiment of a system that includes an optical subsystem and an atomic force microscope (AFM)

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

As used herein, the term "specimen" refers to a wafer at any stage of the semiconductor manufacturing process, a reticle, or any other specimen known in the art. In addition, a specimen may be a biological sample or any other object that may benefit from detailed profiling.

The term "wafer" generally refers to substrates formed of a semiconductor or non-semiconductor material. Examples of such a semiconductor or non-semiconductor material include, but are not limited to, monocrystalline silicon, gallium arsenide, and indium phosphide. Such substrates may be commonly found and/or processed in semiconductor fabrication facilities.

A wafer may include only the substrate such as a virgin wafer. Alternatively, a wafer may include one or more layers that may be formed upon a substrate. For example, such layers may include, but are not limited to, a resist, a dielectric material, and a conductive material. A resist may include a resist that may be patterned by an optical lithography technique, an e-beam lithography technique, or an X-ray lithography technique. Examples of a dielectric material may include, but are not limited to, silicon dioxide, silicon nitride, silicon oxynitride, and titanium nitride. Additional examples of a dielectric material include "low-k" dielectric materials such as Black Diamond™ which is commercially available from Applied Materials, Inc., Santa Clara, Calif., and CORAL™ commercially available from Novellus Systems, Inc., San Jose, Calif., "ultra-low k" dielectric materials such as "xerogels," and "high-k" dielectric materials such as tantalum pentoxide. In addition, examples of a conductive material may include, but are not limited to, aluminum, polysilicon, and copper.

One or more layers formed on a wafer may be patterned or unpatterned. For example, a wafer may include a plurality of dies having repeatable pattern features. Formation and processing of such layers of material may ultimately result in completed semiconductor devices. As such, a wafer may include a substrate on which not all layers of a complete semiconductor device have been formed or a substrate on which all layers of a complete semiconductor device have been formed.

A "reticle," or a "mask," is generally defined as a substantially transparent substrate having substantially opaque regions and/or partially opaque regions formed thereon and configured in a pattern. The substrate may include, for example, a glass material such as quartz. A reticle may be disposed above a resist-covered wafer during an exposure step of a lithography process such that the pattern on the reticle may be transferred to the resist. For example, substantially opaque regions of the reticle may protect underlying regions of the resist from exposure to an energy source.

Turning now to the drawings, it is noted that FIGS. 1-10 are not drawn to scale. In particular, the scale of some of the elements of the figures are greatly exaggerated to emphasize characteristics of the elements. It is also noted that FIGS. 1-10 are not drawn to the same scale. Elements shown in more than one figure that may be similarly configured have been indicated using the same reference numerals.

Figure 2:
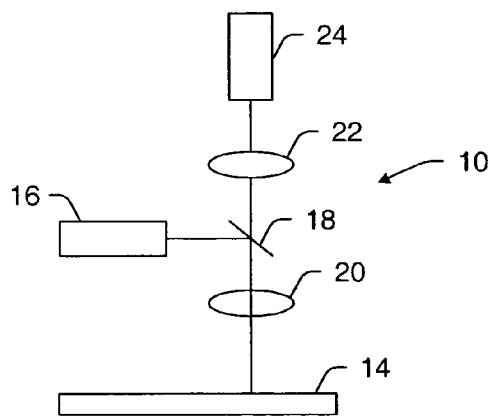
FIG. 2 is a schematic diagram illustrating an enlarged view of the optical subsystem of FIG. 1.

FIG. 1 illustrates one embodiment of a system that includes optical subsystem 10 and atomic force microscope (AFM) 12. An enlarged view of optical subsystem 10 is illustrated in FIG. 2. As shown in FIG. 2, the optical subsystem includes light source 16. Light source 16 may include, for example, a laser, a diode laser, a helium neon laser, an argon laser, a solid state laser, a frequency doubled YAG laser, a xenon arc lamp, a gas discharging lamp, or an incandescent lamp. The light source may be configured to emit near monochromatic light or broadband light. In addition, the light source may be configured to emit ultraviolet light, visible light, and/or infrared light. Furthermore, the light source may be configured to emit light of various polarizations. The light source may also be configured to emit coherent or incoherent light.

Light from the light source may be directed to optical component 18. In the arrangement shown in FIG. 2, optical component 18 may include a partially transmissive mirror or a beamsplitter. In other embodiments, the light may be directed to another optical component such as a folding mirror. In either embodiment, the optical component may be configured to direct the light to specimen 14. As shown in FIG. 2, the optical subsystem also includes lens 20. Lens 20 may be a focusing lens or an objective lens. Although lens 20 is shown in FIG. 2 to include only one lens, it is to be understood that the lens may also be a compound lens. Light returned from the specimen may pass back through lens 20. Optical component 18 may also be configured to allow light returned from the specimen to pass through the optical component to lens 22. In some embodiments, lens 22 may be a collecting lens, a focusing lens, an imaging lens, or a relay lens. As with lens 20, although lens 22 is shown in FIG. 2 to include only one lens, it is to be understood that lens 22 may be a compound lens.

Lens 22 may be configured to direct light or to focus light onto detector 24. Detector 24 may include an array detector such as a charge-coupled device (CCD) camera or a time delay integration (TDI) camera. Other examples of array detectors include a CMOS photodiode, photogate cameras, and bicell detectors. In another example, the detector may include any detector that has a two-dimensional array of photosensitive elements. The detector may or may not be configured to form an image of the specimen or an image of a defect on the specimen.

In some embodiments, the detector may be a position sensitive detector ("PSD"). A PSD is generally an opto-electronic device that can convert an incident light spot into position information. For example, an incident light spot may generate a photoelectric current in a PSD. The generated photoelectric current may flow through the device, and a mathematical relationship between the input and output currents of the device may be used to determine a position of the incident light spot. The position of the incident light spot may be given by a position of a centroid of the incident light spot. In one embodiment, detector 24 may be a 1-dimensional ("1-D") PSD. A 1-D PSD may be configured to detect a light spot moving over its surface in one dimension. Alternatively, detector 24 may be a 2-dimensional ("2-D") PSD. A 2-D PSD may be configured to detect a light spot moving over its surface in two dimensions. The detector may also include any other appropriate detector known in the art.

The optical subsystem may also include a number of other components, which are not shown in FIG. 2, such as a beam expander, folding mirrors, focusing lenses, cylindrical lenses, additional beamsplitters, spectral filters, polarizing filters, polarizers, and waveplates.

In some embodiments, the optical subsystem may be configured as an optical profilometer. Briefly, an optical profilometer is an optical device that determines z or height information about the surface of a sample. Optical profilometers may include tools that use light scattering techniques, light sectioning techniques, and various interferometric techniques. Examples of interferometric optical profiling microscopes include a Fringes of Equal Chromatic Order (FECO), Nomarski polarization interferometer, and differential interference contrast (DIC), Tolansky multiple-beam interferometry, and two-beam based interferometry based on Michelson, Linnik, Fizeau, and Mirau. Additional description of optical profilometers is provided in U.S. Pat. No. 5,955,661 to Samsavar et al., which is incorporated by reference as if fully set forth herein. The optical subsystem may be further configured as described in this patent. In one embodiment, the optical subsystem may be configured as a Linnik microscope that can be used for topography measurements using white-light inteferometry.

In additional embodiments, optical subsystem 10 may be configured as an inspection system or as a part of an inspection system. In one embodiment, the inspection system may be configured for wafer inspection. For example, the optical subsystem as shown in FIG. 2 may be configured to inspect the specimen under bright field conditions. More specifically, the optical subsystem is configured to detect light specularly reflected from the specimen. As shown in FIG. 2, the optical subsystem may be configured to direct the light to the specimen at a normal angle of incidence. However, a bright field inspection system may also be configured to direct the light to the specimen at an oblique angle of incidence. In other embodiments, the optical subsystem may be configured to inspect the specimen under dark field conditions. For example, the optical subsystem may be configured to detect light scattered at non-specular angles from the specimen. Such an optical subsystem may also be configured to direct light to the specimen at any angle of incidence. In some embodiments, the optical subsystem may be configured in a double-darkfield arrangement. For example, the optical subsystem may be configured to illuminate the system with relatively low angle (darkfield) illumination. In addition, lens 22 may be configured as relatively low angle collection optics. The wafer inspection system may include any wafer inspection system known in the art. Examples of suitable wafer inspection systems include the 2351 system, the AIT XP system, the AIT TFH system, the eS25 system, the Surfscan SP1$^{DLS}$ system, the Viper 2401 system, and the Viper 2430 system, which are all available from KLA-Tencor, San Jose, Calif.

In other embodiments, the inspection system may be configured for reticle inspection. A reticle inspection system may be configured to detect light transmitted by and/or reflected from the reticle. In addition, or alternatively, the reticle inspection system may be configured as an aerial-imaging system. The reticle inspection system may also include any reticle inspection system known in the art. Examples of appropriate inspection systems include the SL3UV system and the TeraStar system available from KLA-Tencor.

Any of the above inspection system configurations may be used to detect defects on a specimen. In addition, any of the above inspection systems may be used to generate locations of the defects on the specimen. The locations of the defects may be relative locations (i.e., relative with respect to a permanent notch, flat, or identification mark) on the specimen. Alternatively, the defect locations may be absolute locations on the specimen. For example, the inspection system may be configured to locate a notch, flat, or identification mark on the specimen. The inspection system may also be configured to monitor the position of the specimen with respect to the optical subsystem (or the position of the optical subsystem with respect to the specimen) during inspection of the specimen. In this manner, the inspection system or a processor (not shown) coupled to the inspection system may be configured to use the location of the notch, flat, or identification mark and the monitored position to determine the relative or absolute locations of the defects.

In another embodiment, the optical subsystem may be configured as a defect review system or as part of a defect review system. A defect review system may be used to examine and analyze defects detected by an inspection system. For example, an inspection system or the defect review system may identify a portion of the detected defects for review based on information about the defects such as classification (which may be performed by a processor (not shown) that is or is not coupled to the inspection system or the defect review system) and proximity to other features on the specimen. The defect review system may locate the defects selected for review based on information generated by the inspection system (e.g., defect images, specimen images, and/or coordinates of locations of defects). The defect review system may include a display system (not shown) such that a user can view specimen images and defect images. The display system may also be used to display the properties of the defects. In a defect review system, the optical subsystem may be configured to generate additional images of or information about a specimen or defects on the specimen. For example, the optical subsystem may be a relatively high power microscope or an aerial imaging reticle inspection system. The defect review system may also include an analytical subsystem (not shown). The analytical subsystem may also be used to generate additional information about the specimen or the defects. For example, the analytical subsystem may be a scanning electron microscope or an energy measurement system.

One system that may be used to perform review (or inspection) by energy measurements is the TeraFlux™ energy measurement feature, available from KLA-Tencor on the company's TeraStar™ reticle inspection system. Such energy measurements enable the detection of minute, lithographically significant defects on the highly critical contact and via layers of advanced reticles prior to their printing on wafers. For example, energy measurements may involve measuring the total energy that passes through the contact hole and comparing it to another reference (either die or database) to look for unexpected energy variations. In addition, an energy measurement system measures the energy total of many pixels across the entire contact, and is sensitive to energy flux variations as small as 5%. In critical dimension (CD) terms, this is equivalent to about a 15 nm CD variation in x and y on a contact. This capability enables an inspection system to capture CD defects such as incorrectly sized contacts or semi-transparent defects in the reticle pattern (either of which will adversely affect the amount of light passing through the reticle during the lithography process.)

In some embodiments, the optical subsystem may be configured as a defect dispositioning system or as part of a defect dispositioning system. A defect dispositioning system may be any system that can be used to make decisions regarding individual defects on the specimen. The decisions may include whether or not to repair individual defects, selecting parameters for repair of individual defects, or disposing of the specimen. Making such decisions may include determining how individual defects affect yield. In addition, making such decisions may include determining the cost of repairing individual defects. Furthermore, making such decisions may include assessing risk of damaging the specimen during the repair of individual defects. In this manner, dispositioning the defects may be performed by accounting for the trade off between yield, cost, and technical risk.

In some embodiments, the defect dispositioning system may include an image computer (not shown) or a processor (not shown) coupled to the optical subsystem. The image computer or the processor may be configured to perform one or more computer-implemented methods to make the above described decisions, to determine the effect of individual defects on yield, to determine the cost of repairing individual defects, and/or to assess risk of damaging the specimen during the repair of individual defects. The image computer or the processor may perform the one or more computer-implemented methods using data generated by the optical subsystem (i.e., defect images and/or specimen images). In some embodiments, the defect dispositioning system may locate the defects selected for dispositioning based on information generated by an inspection system (i.e., defect images, specimen images, and/or coordinates of locations of defects). Alternatively, the optical subsystem may be configured to generate information about defects on the specimen, and the defect dispositioning system may select a portion of the defects for dispositioning based on the information.

Figure 3:
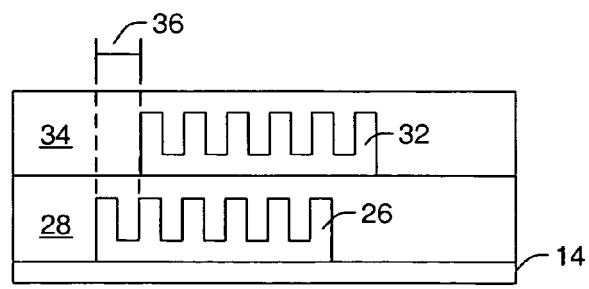
FIG. 3 is a schematic diagram illustrating a cross-sectional view of one embodiment of patterned features on different layers of a wafer.

In some embodiments, the optical subsystem may be configured to measure overlay of a wafer. Overlay is a measure of misalignment between patterned features located on different layers of the wafer. For example, as shown in FIG. 3, patterned features 26 may be located on first layer 28 of specimen 14. In addition, patterned features 32 may be located on second layer 34 of specimen 14. Although the second layer is shown to be formed directly upon an upper surface of the first layer, it is to be understood that one or more layers may be formed between the second layer and the first layer. Such additional layers may be accounted for in the overlay determination and will not prevent the overlay measurements. Patterned features 26 and 32 may be elements of a device pattern that is printed on the different layers of the wafer. Alternatively, features 26 and 32 may be alignment targets that do not form elements of the device pattern. Although the features shown in FIG. 3 are regularly repeating patterned features, it is to be understood that the features that are used for overlay measurement may have any shape (i.e., lines, trenches, contact holes, or vias), period, and orientation known in the art. In addition, features 26 and 32 may or may not have the sane shape, periodicity, and orientation. Furthermore, features 26 and 32 may be non-periodic features.

Overlay measurements reflect displacement 36 between patterned features 26 and patterned features 32. In some instances, the target overlay may be zero displacement between the patterned features on the different layers. Ideally, therefore, the patterned features on the second layer may be directly above the patterned features on the first layer. In contrast, patterned features 26 and 32 shown in FIG. 3 are offset and thus do not meet such a target overlay. In other instances, the target overlay may be some predetermined amount of displacement between the patterned features. In this manner, the patterned features on the second layer may be offset from the position of the patterned features on the first layer. For example, patterned features 26 and 32 shown in FIG. 3 are offset and may or may not meet the target overlay depending on the predetermined amount of displacement set for the target.

In one embodiment, the optical subsystem may be configured to perform advanced optical overlay metrology of the wafer. Examples of such optical subsystems are included in the Archer 10, Archer 10XT, and Archer AIM systems, all commercially available from KLA-Tencor. In general, these systems utilize coherence probe metrology to perform three-dimensional measurements of overlay targets. Briefly, a coherence probe microscope is a form of optical microscope that uses optical images obtained from an interference microscope together with electronic processing to produce a synthetic image whose pixel gray scales are proportional to the absolute value of the mutual coherence function or the degree of coherence between light reflecting off of corresponding pixels in an interference microscope. In a different example, an apparatus configured to perform coherence probe metrology may utilize either broad band or narrow band light to develop a plurality of interference images taken at different axial positions (elevations) relative to the surface under investigation. This data constitutes a series of image planes. The data in these planes is transformed by an additive transformation on the video signal intensities. This transformed image data is used to calculate the absolute mutual coherence between the object wave and reference wave for each pixel in the transformed plane. Synthetic images are formed whose brightness is proportional to this absolute mutual coherence as the optical path length is varied. Further details and examples of coherence probe metrology are illustrated in U.S. Pat. Nos. 4,818,110 to Davidson, 5,112,129 to Davidson et al., and 5,438,413 to Mazor et al., which are incorporated by reference as if fully set forth herein. The optical subsystem and the system may be further configured as described in these patents.

In different embodiments, the optical subsystem may be configured to measure overlay of a wafer using scatterometry. Scatterometry overlay analysis has recently become an area of significant interest for the semiconductor industry. Current approaches to scatterometry overlay analysis use an optical scatterometry technique to detect misalignment between patterns of known characteristics disposed in different layers of a wafer.

Scatterometry is the angle-resolved measurement and characterization of light diffracted from periodic features. For periodic features, incident light is scattered into different orders. The diffracted light pattern from a feature or more than one feature may be used as a "fingerprint" or "signature" for identifying characteristics of the feature(s). In some embodiments, the diffraction efficiency of light diffracted from patterned features on the wafer may be measured and used to determine one or more characteristics of the patterned features. The diffracted light pattern or the diffraction efficiency may be measured as a function of wavelength and/or angle of incidence. Characteristics of the feature include, but are not limited to, overlay, period, a lateral dimension (e.g., width or height), the shape of the feature, sidewall angle, and line edge roughness. In addition, other characteristics of the wafer may be determined from the diffracted light patterns or the diffraction efficiency such as thicknesses of underlying structures or films.

The characteristics may be determined using the fingerprint or the signature and a diffraction model such as the model method by modal expansion (MMME) or the rigorous coupling waveguide analysis (RCWA). The diffraction model may be used to calculate theoretical diffracted light fingerprints or signatures of patterned features in the parameter space. The theoretical diffracted light fingerprints or signatures may be stored in a database. A statistical predication algorithm such as the partial-least-squares (PLS) or minimum-mean-square-error (MMSE) may be trained on this theoretical data. The characteristics of unknown features may be determined as the parameters of the theoretical diffracted light fingerprint or signature that most closely matches the signature measured for the unknown features. Any other model, algorithm, or method for determining the characteristics of the features known in the art may also be used.

In addition, for overlay measurements of a wafer such as that shown in FIG. 3, patterned features 26 and 32 on both layers of the wafer will affect the light pattern diffracted from the specimen since patterned features 26 and 32 may be at least partially located within the same measurement spot. That is, diffraction of light from a measurement location in which patterned features 26 and 32 are located will be affected by the characteristics of patterned features 26 and 32 and their relative positions. The models described above can be parameterized for overlay measurements, and the overlay of the patterned features may be determined as described above. The optical subsystem may be configured as a scatterometer, a 2-Θ scatterometer, a spectroscopic scatterometer, a non-imaging scatterometer, or an imaging scatterometer. Further details and examples of scatterometry are illustrated in PCT International Publication No. WO 99/45340 by Xu et al., "Scatterometry for CD measurements of etched structures", Raymond et al., SPIE, vol. 2725, 1996, pp. 720-728, "Use of Scatterometric Latent Image Detector in Closed Loop Feedback Control of Linewidth", Sturtevant et al., SPIE, vol. 2196, 1994, pp. 352-359, and U.S. Pat. Nos. 5,889,593 to Bareket and 5,917,594 to Norton, which are incorporated by reference as if fully set forth herein. The optical subsystem and the system may be further configured as described in these publications and patents.

Figure 4:
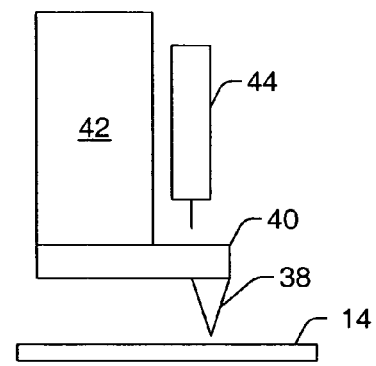
FIG. 4 is a schematic diagram illustrating an enlarged view of the AFM of FIG. 1.

An enlarged view of AFM 12 is illustrated in FIG. 4. In general, an AFM is used to measure the topography of a surface of a specimen by placing a relatively sharp probe tip relatively close to the specimen (i.e., within angstroms) to detect small forces between the probe and the specimen due to the atoms on the specimen surface. For example, a strong repulsive force between the probe and the surface may be present when the probe is very near the surface of the specimen due to the exclusion principle. Such a mode of operation may be commonly referred to as "contact-mode scanning." Contact-mode scanning may be particularly suitable for certain specimens such as specimens having static charge buildup on the surface or fluid layer buildup on the surface. In contrast, if the probe is farther from the surface (i.e., several nanometers from the surface of the specimen), a small attractive force may be present between the probe and the surface of the specimen. This mode of operation may be commonly referred to as the "non-contact, attractive mode of scanning." The attractive mode of scanning may be particularly suitable for imaging high-aspect ratio features that are commonly found on semiconductor wafers since lateral forces from approaching sidewalls can be sensed in this mode. The measurement results may be used to generate three-dimensional images of the specimen surface. The images are a record of the motion of the probe as it is scanned across the specimen.

In a general configuration, AFM 12 includes probe 38 coupled to cantilever 40, as shown in FIG. 4. Although the probe is shown in FIG. 4 to be a sharp needle-like probe, it is to be understood that the probe may have any shape known in the art such as a flared tip, which may be commonly referred to as a "boot tip," or a conical- or pyramidal-shaped tip having a rounded end. An appropriate shape for the AFM probe may vary depending upon, for example, the topography of the specimen to be measured. In addition, the probe may be formed of different materials such as, but not limited to, etched or milled silicon/silicon nitride, etched quartz fibers, or electron-beam-deposited carbon. The cantilever is coupled to fine scanner 42, which may be configured to scan the probe over the specimen laterally in the x and/or y directions. The directions in which the probe is scanned may vary depending upon, for example, the characteristics of the specimen that are being measured. For example, if the CD of features on the specimen is being measured, the probe may be scanned over the specimen in both lateral directions. One advantage of using an AFM to measure CD as compared to other techniques such as optical microscopy and scanning electron microscopy (SEM) is that the number of data points measured with the AFM may be increased at feature sidewalls or at abrupt topographical changes such as abrupt changes in surface height.

Sensor 44 is arranged proximate cantilever 40 and is configured to detect displacement of the cantilever. In one example, the sensor may measure the amplitude, frequency, and phase of oscillation of the cantilever caused by forces between the probe and the specimen surface. In combination, the sensor and the cantilever form a force sensor (i.e., forces between the surface and the probe are measured by monitoring the displacement of the cantilever with the sensor during scanning). In operation, forces between the probe and specimen 14 are sensed as the probe is brought towards the specimen surface. The distance between the probe and the specimen may be maintained by a constant force, which may be controlled by a servo subsystem (not shown in FIG. 4). The displacement of the cantilever acquired during scanning of the specimen may be measured by the sensor. In some embodiments, the sensor may measure the displacement of the cantilever optically. For example, the sensor may be configured to illuminate a portion of the cantilever and to detect light reflected from the cantilever using a PSD or an interferometer. Output generated by the sensor may be used by a processor (not shown) to determine topographic information about the specimen or detailed surface profiling in three dimensions.

The configuration of the force sensor (i.e., the combination of the sensor and the cantilever) shown in FIG. 4 represents one general configuration for a force sensor. However, the force sensor may have several different configurations including, but not limited to, a one-dimensional resonant micro-cantilever, a two-dimensional resonant micro-cantilever, a piezoresistive micro-cantilever, an electrostatic force balance beam, and a lateral/shear-force resonant fiber, which are all known in the art. One example of a currently available AFM is the SXM workstation commercially available from IBM Corporation, Armonk, N.Y. AFM systems are also commercially available from Seiko Instruments, Inc., Scientific Instruments Division, Japan.

In one embodiment, the AFM may be configured to measure a characteristic of a feature or a portion of a feature on a specimen such as a wafer. In addition, overlay of patterned features on the wafer may be measured optically as described above. In some embodiments, the feature that is measured by the AFM may include one of the patterned features that is measured by the optical subsystem to determine overlay. In addition, AFM profiling may be performed on less than all features or on less than all layers involved in the overlay measurement. In another embodiment, the AFM may be configured to measure a characteristic of each of the patterned features located on each of the different layers that are measured by the optical subsystem to determine the overlay. In this manner, the AFM may analyze each structure in each layer that the optical subsystem will use in the scatterometry measurements. In yet another embodiment, the AFM may be used to measure overlay of the patterned features instead of using an optical subsystem to measure the overlay. In this manner, an AFM may completely replace the optical subsystem of an overlay measurement system.

In the above embodiments, the system may be configured to alter the overlay measured by the optical subsystem using the characteristic measured by the AFM. For example, if a lateral dimension of one or more of the patterned features is measured by the AFM, a processor (not shown) of the system may compare this lateral dimension to a lateral dimension of the patterned features measured by the optical subsystem or obtained from one of the models or algorithms described above. If there is a discrepancy between the two values for the lateral dimension, the lateral dimension measured by the AFM may be used as an input into the model as a known value. The overlay may then be recalculated. In another example, the detailed AFM profile of each structure (or of only a portion of each structure) in each layer under consideration may be stored together with corresponding x and y surface coordinate information. The stored AFM profile data for each structure may then be compared based on the x-y coordinate information, and any deviations from the expected baseline may be processed to determine the misalignment between the corresponding layers. In this manner, the AFM measurements may be used to correct the overlay measurements. Other characteristics measured by the AFM may be used to alter the overlay in a similar manner. As such, the methods and systems described herein may be used to enhance the accuracy of overlay measurements performed by scatterometry or other optical techniques using measurements by an AFM. In addition, the measurements performed with the AFM may be used to correct any measurement performed by the optical subsystem. In this manner, errors in the optical measurements may be compensated for by calibration using the AFM.

In another such embodiment, the system may be configured to validate the overlay measured by the optical subsystem using the characteristic measured by the AFM. In one particular example, the AFM measurements may be used to validate the overlay measurements performed using scatterometry. For example, the characteristics measured by the AFM may be compared to characteristics of the patterned features measured by the optical subsystem or calculated using one of the models or algorithms described above. Since the characteristics are independently measured or determined, the characteristic measured by the AFM may verify the overlay measurement if the independently determined characteristics of the patterned features match with some degree of certainty.

Although the AFM probe can perform surface profiling with a relatively high degree of accuracy, its speed of operation is relatively low. Consequently, precise positioning of the AFM probe on the surface to be profiled is important to ensure adequate throughput.

In one embodiment, optical subsystem 10 may be configured to generate positional information about a location on a surface of specimen 14. For example, the optical subsystem may be used to identify particular surface coordinates where the AFM probe is to be positioned. The system may be configured to position the AFM probe proximate the location based on the positional information. In one embodiment, the system may include servo subsystem 46, as shown in FIG. 1. The servo subsystem may be configured to receive the positional information from the optical subsystem. For example, the servo subsystem may be coupled to the detector of the optical subsystem, as shown in FIG. 1, and may be configured to receive the positional information from the detector. Alternatively, the servo subsystem may be coupled to an electronic component (not shown) or a processor (not shown) of the optical subsystem and may be configured to receive the positional information from the electronic component or the processor.

In addition, the servo subsystem may be configured to move the probe to the location on the surface of the specimen. The servo subsystem may be configured to move the AFM probe with relatively high speed to the intended position on the specimen and to bring the probe toward the surface to an appropriate distance. The AFM may then commence profiling of the surface. For example, as shown in FIG. 1, the servo subsystem may be coupled to the fine scanner of the AFM. The servo subsystem may be configured to control the fine scanner of the AFM based on the positional location such that the probe may be positioned proximate the location. In a different embodiment, the servo subsystem may be configured to provide signals to the fine scanner of the AFM or electronics (not shown) coupled to the fine scanner based on the positional location. The fine scanner or the electronics coupled to the fine scanner may be configured to use the signals from the servo subsystem to determine the selected location on the specimen and to move the probe proximate the location. The servo subsystem may be coupled to one or more of the components of the system as described above by transmission medium 47. The transmission medium may include "wired" and "wireless" portions. An appropriate servo subsystem may include piezo actuators or any other suitable servo subsystem known in the art.

Figure 5:
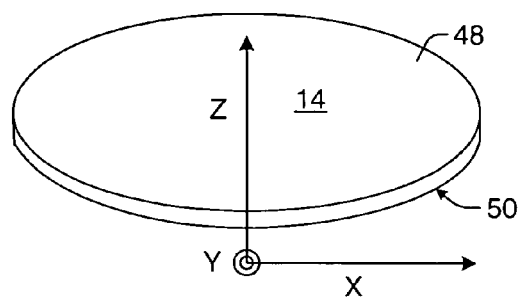
FIG. 5 is a schematic diagram illustrating a perspective view of an embodiment of a specimen.

In one embodiment, the positional information generated by the optical subsystem may include x and y coordinates of a location on the specimen. The orientation of the coordinate system with respect to a wafer is illustrated in FIG. 5. The X axis of the specimen may be defined in a lateral direction parallel to upper surface 48 or lower surface 50 of specimen 14 (as shown in FIG. 5, in the plane of the paper). The Y axis of the specimen may be defined in a lateral direction parallel to the upper or lower surface of the specimen and in a direction perpendicular to the X axis (as shown in FIG. 5, into the plane of the paper). In addition, the directions of the X and Y axes may be switched such that the X axis is defined into the plane of the paper and such that the Y axis is defined in the plane of the paper. In other embodiments, the positional information generated by the optical subsystem may include polar coordinates of the specimen (i.e., r and $\theta$ coordinates of the location on the specimen). The r$\theta$ coordinates may be translated into x and y coordinates (or vice versa) by the servo subsystem, other electronics (not shown) coupled to the system, or a processor (not shown) coupled to the system. One embodiment of coordinate translation may be implemented using X-LINK, which is commercially available from KLA- Tencor, and automating the X-LINK capability for creating translated coordinates. The orientation of the coordinate system may be defined with respect to other specimen in a similar manner.

In another embodiment, the optical subsystem and the AFM may be coupled such that a substantially constant distance, or offset, in the x and y directions is arranged between the optical subsystem and the AFM. For example, the optical subsystem and the AFM may be mounted in a single measurement head, and the positions of the optical subsystem and the AFM within the measurement head may be relatively fixed. The optical subsystem may be used to locate a position or measurement location on the specimen. In addition, the system may be configured to move the AFM to the position based on the offset between the optical subsystem or the AFM. The system may move the AFM to the measurement location on the specimen either by moving a stage on which the specimen is disposed or by moving the optical subsystem and the AFM. The amount of the offset can be determined from the design of the system. However, manufacturing of the system may produce variation or error in the offset.

The actual offset between the optical subsystem and the AFM may be determined by calibrating the system using a test object. For example, the test object may be measured with the optical subsystem. The AFM may be positioned proximate the test object based on the optical measurements. The test object may then be measured with the AFM to generate the location of the object, which can be compared to the location of the object determined using the optical subsystem. The designed offset may then be corrected based on the difference between the two different locations to determine the actual offset. As such, the AFM may be moved to a measurement location detected optically with greater accuracy based on the actual offset between the AFM and the optical subsystem. Additional examples of calibrating the offset between an optical profilometer and a stylus probe measuring device are illustrated in U.S. Pat. No. 5,955,661 to Samsavar et al., which is incorporated by reference as if fully set forth herein. The system may be further configured to calibrate the offset as described in this patent.

In an additional embodiment, the positioning accuracy of the servo subsystem can be enhanced by a priori generation of positional information using the optical subsystem. For example, the optical subsystem may be used to identify particular surface coordinates for multiple locations on the surface of specimen 14. Once these coordinates are available, the system may be configured to correct the servo subsystem destination position using this information.

In another embodiment, additional positioning accuracy of the servo subsystem can be achieved by a priori generation of positional information based on AFM three dimensional (3D) imaging capabilities. For example, the AFM subsystem may be used to identify particular surface coordinates for multiple locations on the surface of specimen 14 using the 3D images generated by the AFM subsystem. Once these coordinates are available, the system may be configured to correct the servo subsystem destination position using this information.

Figure 6:
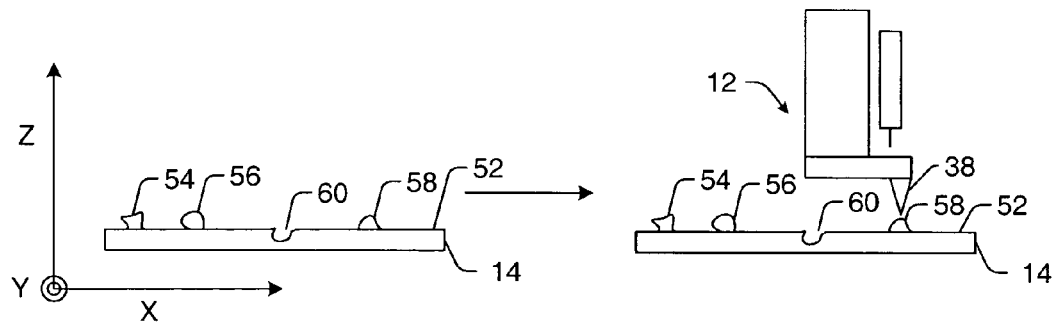
FIG. 6 is a schematic diagram illustrating a cross-sectional view of defects on a specimen and an AFM positioned proximate the location of one of the defects.

In one embodiment, if the optical subsystem is configured as an inspection system as described above, the optical subsystem may detect a number of defects on the surface of the specimen. For example, FIG. 6 illustrates 4 different defects that may be detected on surface 52 of specimen 14. As shown in FIG. 6, the defects may include surface defects 54, 56, and 58 and subsurface defect 60. It is to be understood, however, that any number of surface defects and/or subsurface defects may be detected on the specimen. As further shown in FIG. 6, each of the defects is located at a different position on the specimen. It is also to be understood, however, that each of the defects may be located at any position on the specimen. Furthermore, although unwanted material defects and a void defect are shown in FIG. 6, it is to be understood that the optical subsystem may be configured to detect any type of defect known in the art such as contamination on a specimen, abnormal structures on the specimen, damage to the specimen, subsurface pits or crystal originated pits (COPS), subsurface voids, or microscopic scratches. In general, the term "defect" is used herein to refer to any abnormality formed on or within a specimen that may adversely affect the performance or functionality of a device formed on the specimen (i.e., reduce a characteristic such as speed or cause a device failure that may or may not cause a device to be non-working) or additional devices formed on the specimen if the defect is not fixed.

The optical subsystem may generate positional information about the locations of the defects detected on the surface of the specimen by the inspection system. The positional information may be associated with individual defects, for example, using a data structure or a rules database. Therefore, the AFM probe may be positioned proximate the locations of the defects selected for analysis by the AFM based on the positional information associated with the selected defects. For example, as shown in FIG. 6, defect 58 may be selected for analysis by the AFM probe. The positional information associated with this defect may be used to position the probe proximate this defect as described herein. The analysis to be performed by the AFM probe may include CD measurement and/or three-dimensional profiling of the defect.

In another embodiment, if the optical subsystem is configured as a defect review system, the optical subsystem may generate positional information about a location of a defect identified by the defect review system for analysis with the AFM probe. For example, the optical subsystem may be configured to review defects located in particular areas of the surface of interest. If the optical subsystem is unable to conclusively disposition possible defects in the areas under consideration, the AFM may be used to profile those areas to help identify and otherwise disposition the respective possible defects.

In the embodiments described above, therefore, the optical subsystem may inspect a larger area of the surface under consideration and may identify particular areas on the specimen that contain defects and, as such, may determine that further review of these particular areas and/or defects is desirable. In some embodiments, the optical subsystem may identify surface areas for AFM profiling based on a die to die comparison, a die to database comparison, or designer intent information. Examples of designer intent data and methods of use are illustrated in U.S. Pat. No. 6,529,621 B1 to Glasser et al., and PCT Application No. WO 00/36525 by Glasser et al., which are incorporated by reference as if fully set forth herein. Once the areas are identified for further review, the appropriate surface coordinates are communicated from the optical subsystem to the AFM. The AFM probe may then perform detailed profiling of the areas identified by the optical subsystem to adequately disposition the potential corresponding defects.

In another embodiment, the positional information generated by the optical subsystem may include a z position for the probe based on three-dimensional information about the surface of the specimen. As shown in FIG. 5, the Z axis of the specimen may be defined in a direction perpendicular to upper surface 48 or lower surface 50 of specimen 14. In one example, information about the specimen at a location on the specimen may be generated by the optical subsystem. This information and a predetermined distance that the probe is to be spaced from the specimen at the start of scanning may be used to determine a z position of the probe. The probe may be placed at the z position with respect to the location on the specimen prior to scanning. In some embodiments, the z position may be spaced from the upper surface of the specimen by a distance that is approximately equal to the distance that is maintained between the specimen and the probe during scanning. In this manner, the probe may be focused prior to scanning based on the positional information generated by the optical subsystem. Alternatively, the z position of the probe may be spaced from the upper surface of the specimen by a distance that is greater than the distance that is maintained between the specimen and the probe during scanning. For example, the probe may be coarse focused prior to scanning based on the positional information generated by the optical subsystem. The probe may then be brought into fine focus by the fine scanner of the AFM. However, the z position may be substantially closer to the upper surface of the specimen than the z position at which the AFM probe may normally be placed prior to scanning without such three-dimensional information. In this manner, the optical subsystem may select an appropriate z position for the AFM probe depending on the general three-dimensional profile of the sub-area to be profiled to decrease the operational time of the AFM probe.

Figure 7:
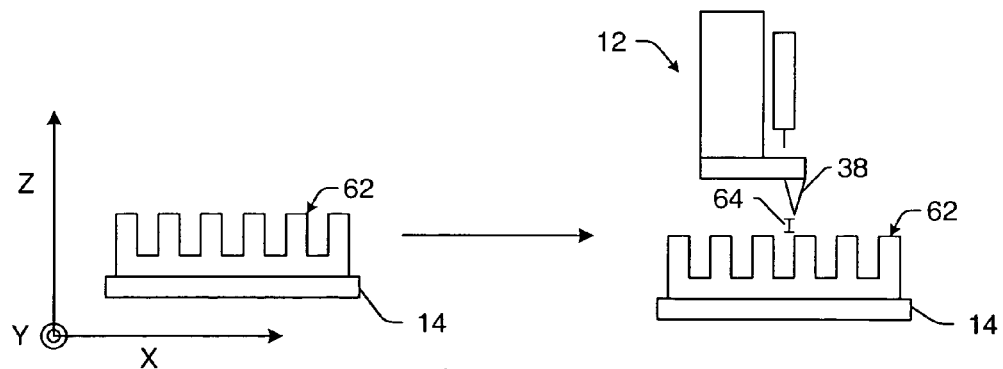
FIG. 7 is a schematic diagram illustrating a cross-sectional view of features on a specimen and an AFM positioned a spaced distance above the features.

In one such embodiment, the optical subsystem may be configured to generate three-dimensional information about the location on the surface of the specimen. For example, as shown in FIG. 7, the optical subsystem may be configured to generate three-dimensional information 62 about features on the surface of specimen 14. The three-dimensional information may include information about the features on the specimen in the z direction such as height as a function of x and/or y position. In a similar manner, the optical subsystem may be configured to generate three-dimensional information about specimen surfaces that do not include features (i.e., an unpatterned specimen surface), but which may or may not include defects and other surface topography such as roughness. In this manner, the information about the specimen surface in the z direction may include surface height or roughness as a function of x and/or y position on the specimen. For example, as shown in FIG. 6, the optical subsystem may be configured to generate three-dimensional information about defects 54, 56, 58, and 60 on the surface of specimen 14. The three-dimensional information may include information about the defects on the specimen and the specimen surface such as height and/or roughness as a function of x and/or y position. In this manner, the optical subsystem may also provide general three-dimensional information about the area to be profiled to the AFM to enable the selection of an appropriate baseline distance from the wafer during profiling. Selecting an appropriate baseline in this manner may decrease the time used by the AFM probe to profile the surface of the specimen by decreasing the vertical distance that the probe must travel while scanning the surface.

In addition, the system may be configured to position probe 38 of AFM 12 a spaced distance 64 from the location on the surface of the specimen based on the three-dimensional information, as shown in FIG. 7. The spaced distance may be approximately equal to the distance that is maintained between the specimen and the probe during scanning. Alternatively, the spaced distance may be greater than the distance that is maintained between the specimen and the probe during scanning. However, the spaced distance may be substantially less than that at which the AFM probe may normally be initially spaced from the specimen prior to scanning without such three-dimensional information. As further shown in FIG. 7, the z position at which the AFM probe is positioned depends on the spaced distance and the surface height of the specimen. In addition, the surface height varies as a function of location on the surface of the specimen. Therefore, the z position depends on the location on the surface of the specimen at which the AFM is placed.

Figure 8:
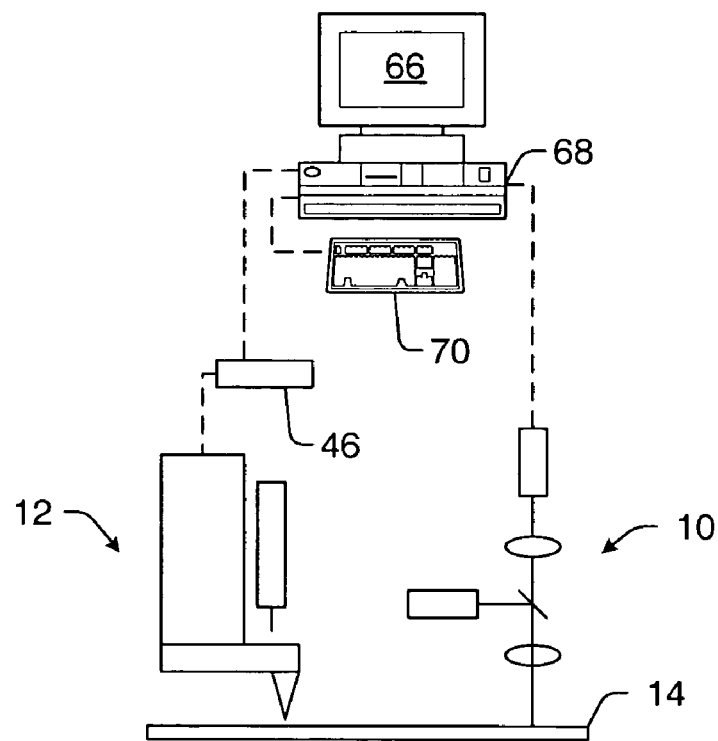
FIGS. 8-10 are schematic diagrams illustrating side views of additional embodiments of a system that includes an optical subsystem and an AFM.

In another embodiment, the optical subsystem may be configured to generate images of the specimen, as described above. The system may include a graphical user interface (GUI) (not shown). The GUI may be configured to display the images to a user. The GUI may include any computer working environment known in the art that can display specimen images, files, and operations visually using icons, buttons, windows, and other imagery that can be manipulated by a user. The GUI may be displayed on display device 66 shown in FIG. 8. The display device may include a cathode ray tube (CRT) or any computer monitor or display device known in the art such as a plasma display device or a liquid crystal display device. For example, processor 68 may be configured to receive data from the detector or other electronics (not shown) of the optical subsystem. The processor or the other electronics may be configured to generate the images. The processor may also be configured to display the images of the specimen within the GUI on display device 66. The system may also include user input device 70. As shown in FIG. 8, one example of a user input device is a keyboard. However, the system may include other user input devices such as a mouse and a touch pad. In addition, the display device may be a touch-sensitive screen that can sense the location at which the user touches the screen. In this manner, the display device may be used as the user input device. Preferably, the user input device is configured such that the user can use the user input device to select the location at which to position the probe based on the images displayed on the GUI.

Figure 9:
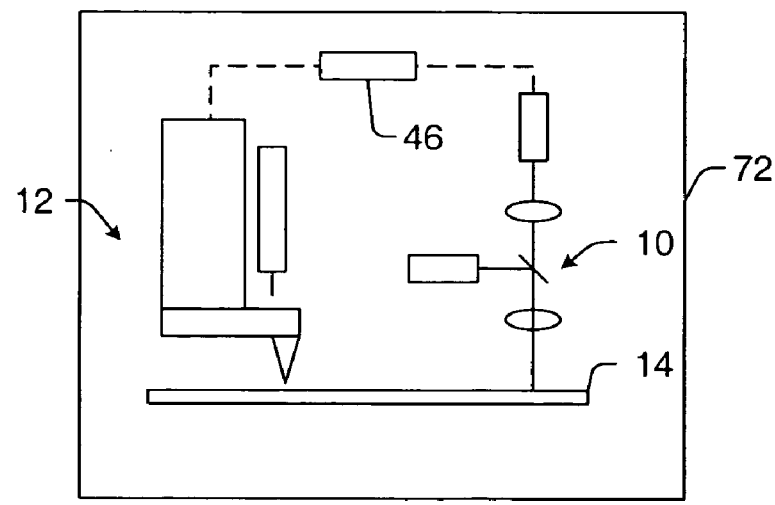

As shown in FIG. 9, optical subsystem 10 and AFM 12 may be arranged within housing 72. In this manner, optical subsystem 10 and AFM 12 may be incorporated into one tool. The AFM and the optical subsystem may be mounted in a single measurement head or in different measurement heads. In this manner, the offset between the AFM and the optical subsystem in the x and y directions may be substantially constant or may vary. In addition, the optical subsystem and the AFM may share a common stage (not shown), a common power source (not shown), a common specimen handler (not shown), a common processor (not shown), and a common environment within the housing. The tool may not be coupled to other tools except by one or more transmission mediums. In this manner, the tool may be configured as a stand-alone tool. Alternatively, the tool may be incorporated into another tool such as a process tool (not shown). In this manner, the tool may be configured to examine a specimen during a process carried out in the process tool. Alternatively, or in addition, the tool may be configured to examine a specimen while the specimen is disposed within the process tool but before or after a process carried out in the process tool. In some embodiments, the tool may be coupled to the process tool by a common stage, a common specimen handler, a common power source, and/or a common processor. The process tool may include a cluster tool that may be used to fabricate semiconductor devices. Examples of process tools that the optical subsystem and AFM tool may be coupled to include, but are not limited to, a lithography tool, an etch tool, a chemical-mechanical polishing tool, a deposition tool, a plating tool, and a cleaning tool.

The optical subsystem and the AFM may be configured to examine the same surface of the specimen. For example, as shown in FIG. 9, the optical subsystem and the AFM are arranged on the same side of the specimen. In addition, the optical subsystem and the AFM may be configured to examine different portions of the specimen surface. For example, the optical subsystem may be configured to inspect a first position on the specimen surface, and the AFM may be configured to measure a characteristic of one or more features at a second position on the specimen, which is spaced from the first position. In another example, the optical subsystem may be configured to measure overlay at a first position on the wafer, and the AFM may be configured to measure a characteristic of one or more features at the second position on the wafer. In some embodiments, the AFM may be configured to measure the characteristic of the one or more features at the second position while the optical subsystem measures the overlay of the wafer at the first position. In this manner, optical scatterometry overlay analysis may be performed in parallel with AFM profiling analysis on different targets located at different positions on the surface of interest.

Alternatively, the optical subsystem and the AFM may be configured to examine the specimen surface at different times. In one such embodiment, the optical subsystem or the AFM, which is not being used to examine the specimen surface, may be moved away from the specimen surface. In this manner, only the optical subsystem or the AFM may be positioned above the specimen surface at one time. The optical subsystem or the AFM may be moved away from the specimen surface by a servo subsystem such as servo subsystem 46, which is described further above. Although the servo subsystem is shown in FIG. 9 to be arranged within housing 72, it is to be understood that the servo subsystem may also be arranged external to the housing. In addition, although the specimen is shown to be arranged within the housing, it is to be understood that the specimen may also be located outside of the housing while the specimen is being examined by the optical subsystem or the AFM. In one such embodiment, the housing may include an opening such that the AFM may be brought sufficiently close to any location on the specimen surface for examination.

The system may include additional components, which are not shown in FIG. 9. For example, the system may include a stage that is configured to support the specimen. The stage may also be configured to translate the specimen in one or more directions such that different locations on the specimen may be examined by the optical subsystem and/or the AFM. In addition, the stage may be configured to translate the specimen in one or more directions such that the specimen may be aligned prior to examination. Alternatively, the system may include an alignment module. The alignment module may be configured to coarse align the specimen, as opposed to fine alignment or substantially precise alignment prior to examination of the specimen. In some embodiments, the alignment module may include an optical subsystem. The optical subsystem may be configured to illuminate the specimen and to detect an alignment mark on the specimen. In some cases, the alignment mark may be a notch, a flat, or some other indentation into the periphery of the wafer. In other cases, the alignment mark may be a permanent identification mark such as a series of alphanumeric characters formed on the specimen. In addition, the alignment mark may include any feature formed on the specimen. Coarse aligning a specimen prior to inspection or analysis allows scanning to begin at a predetermined position on the specimen. In addition, scanning of multiple specimens may begin at approximately the same place on each wafer. Furthermore, if the scan begins at a relatively known position on a specimen, the data acquired during scanning may be assigned relative or absolute positions with respect to the alignment mark.

The system may also include a load module. The load module may be configured to receive and hold one or more specimens. For example, the load module may be configured to receive a single wafer or reticle, or more preferably a wafer cassette or reticle pod. In addition, the inspection system may include a specimen handler such as a robotic wafer handler or any other specimen handler known in the art. The handler may be configured to remove a specimen from the load module. If pre-alignment is to be performed, the handler may place the specimen in the alignment module. After coarse alignment of the specimen, the handler, or in alternative embodiments a second, different specimen handler, may move the specimen from the alignment module to the stage.

Figure 10:
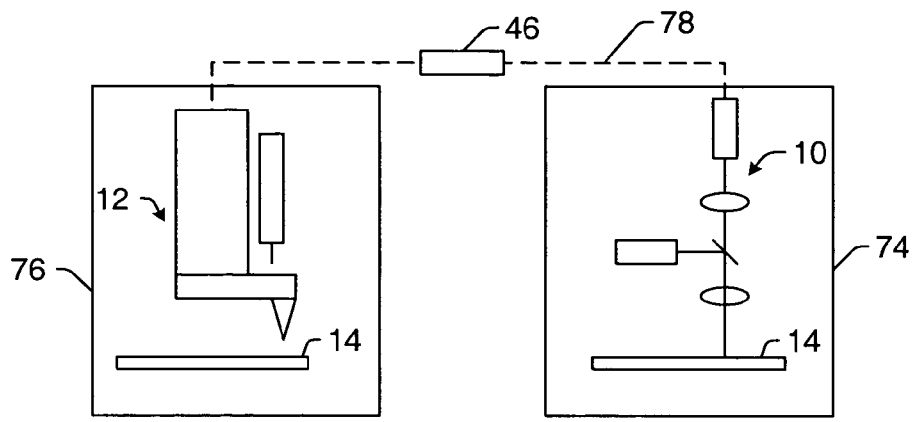

In an alternative embodiment, optical subsystem 10 and AFM 12 may be arranged within different housings 74 and 76, respectively, as shown in FIG. 10. In this manner, the optical subsystem may be configured as one tool, and the AFM may be configured as a second, separate tool. In addition, the optical subsystem and the AFM may be coupled by transmission medium 78. The optical subsystem may communicate with the AFM via the transmission medium. Servo subsystem 46 may also be coupled to the optical subsystem and/or the AFM by the transmission medium. The servo subsystem may be configured as described above. As shown in FIG. 10, the servo subsystem may be disposed external to housings 74 and 76. Alternatively, the servo subsystem may be disposed within one of the housings.

The optical tool and/or the AFM tool may not be coupled to other tools (i.e., stand-alone tools) except by one or more transmission mediums. Alternatively, the optical tool and/or the AFM tool may be incorporated into another tool such as a process tool, as described above. The process tool may include any of the process tools described above.

The optical subsystem and the AFM may be configured to examine the same surface of specimen 14. In addition, although the specimen is shown to be arranged within housings 74 and 76, it is to be understood that the specimen may also be located outside of the housings while the specimen is being examined by the optical subsystem or the AFM. In one such embodiment, housing 76 may include an opening such that the AFM may be brought sufficiently close to any location on the specimen surface for examination. The optical tool and/or the AFM tool may include additional components, which are not shown in FIG. 10, and which may be configured as described above. For example, the tools may include a stage that is configured to support the specimen, an alignment module, a load module, and/or a specimen handler.

Figure 11:
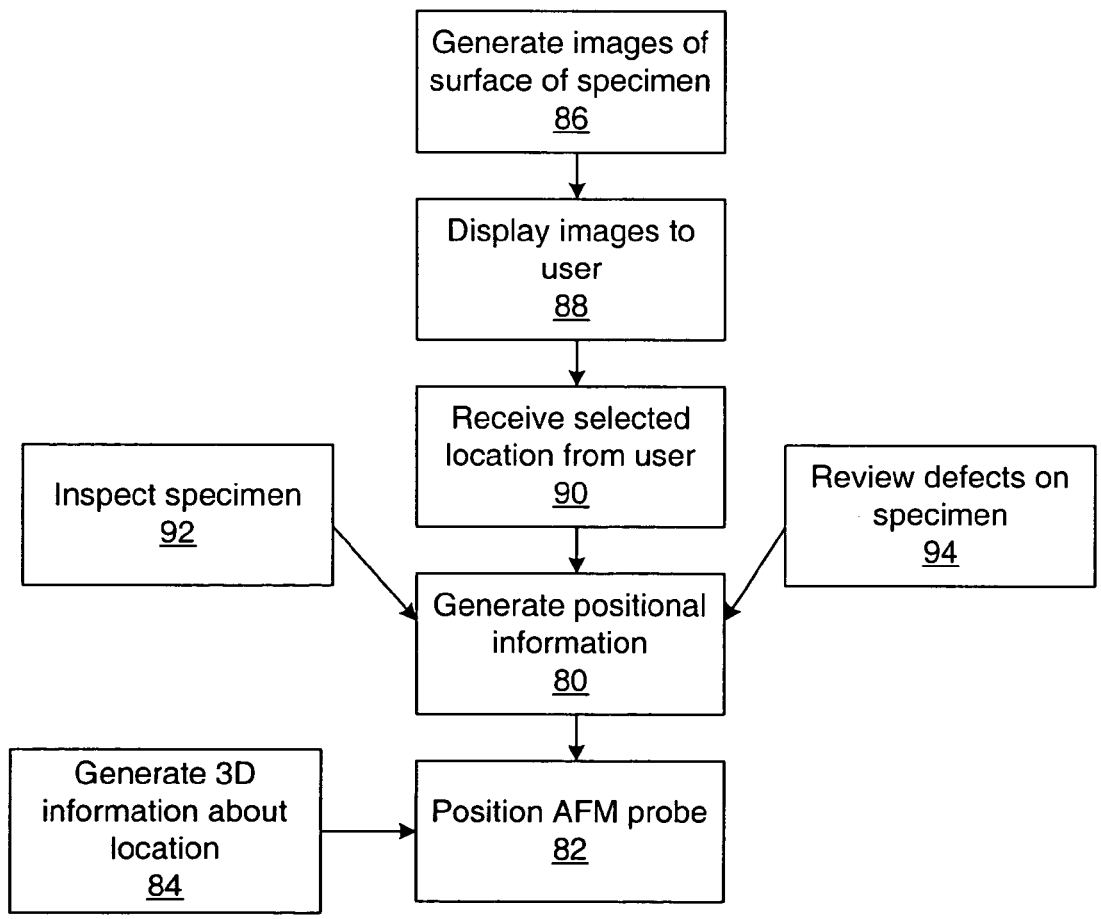
FIG. 11 is a flow chart illustrating an embodiment of a method for positioning an AFM probe.

FIG. 11 illustrates one embodiment of a method for positioning an atomic force microscopy probe. It is noted that all of the steps shown in FIG. 11 are not essential to practice of the method. One or more steps may be omitted or added to the method illustrated in FIG. 11, and the method can still be practiced within the scope of this embodiment. The method includes generating positional information about a location on a surface of a specimen with an optical subsystem, as shown in step 80. The positional information may include x and y coordinates of the location. The optical subsystem may be configured as described above. The method also includes positioning an AFM probe proximate the location based on the positional information, as shown in step 82. The AFM probe may be configured as described above.

In one embodiment, the method may include generating three-dimensional information about the location on the surface of the specimen with the optical subsystem, as shown in step 84. Such an embodiment may also include positioning the probe a spaced distance from the location on the surface of the specimen based on the three-dimensional information. In another embodiment, the positional information may include a z position for the probe based on three-dimensional information about the surface of the specimen.

In an additional embodiment, the method may include generating images of the surface of the specimen with the optical subsystem, as shown in step 86. In such an embodiment, the method may also include displaying the images to a user such that the user can select the location using the images, as shown in step 88. The images may be displayed as described above. The user may select the location using a user input device as described above. In addition, the method may include receiving the selected location from the user, as shown in step 90. The selected location may be received through the user input device. In addition, the method may include generating positional information about the selected location, as shown in step 80. Such a method may also include positioning the AFM probe proximate the selected location based on the positional information, as shown in step 82.

In another embodiment, the method may include inspecting the specimen with the optical subsystem, as shown in step 92. The location may correspond to a location of a defect detected on the specimen. In a different embodiment, the method may include reviewing defects detected on the specimen with the optical subsystem, as shown in step 94. In one such embodiment, the location may correspond to a location of one of the defects identified for further analysis with the probe. These methods may also include generating positional information about the location of the defect detected on the specimen or the defect identified for further analysis with the AFM, as shown in step 80. In addition, the method may include positioning the AFM probe proximate the defect location based on the positional information, as shown in step 82. Each of the embodiments of the method described above may also include any other step(s) described herein.

Figure 12:
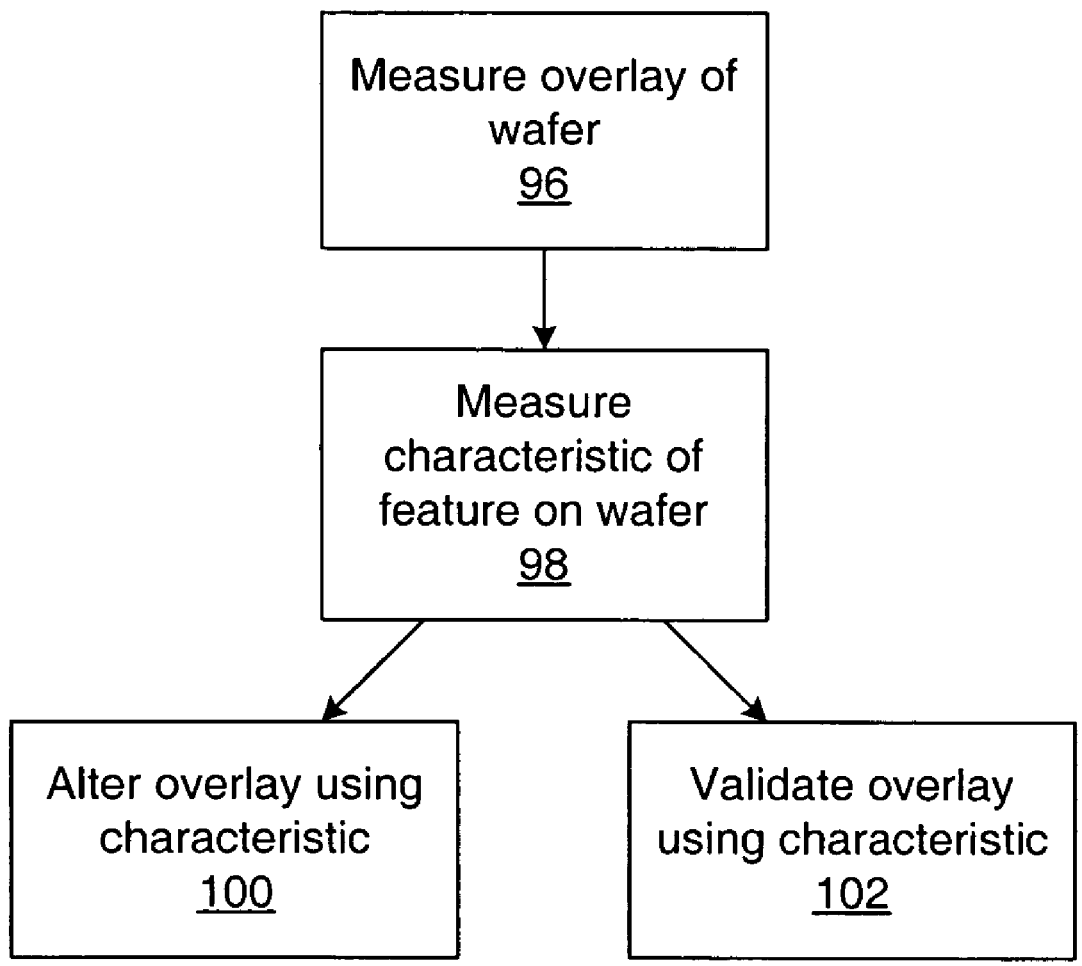
FIG. 12 is a flow chart illustrating an embodiment of a method for measuring overlay and characteristics of features on a wafer.

FIG. 12 illustrates an embodiment of a method for measuring overlay and characteristics of features on a wafer. It is noted that all of the steps shown in FIG. 12 are not essential to practice of the method. One or more steps may be omitted or added to the method illustrated in FIG. 12, and the method can still be practiced within the scope of this embodiment. The method includes measuring overlay of a wafer using scatterometry, as shown in step 96. Scatterometry as an overlay measurement technique is described in more detail above. As also described in more detail above, overlay is a measure of misalignment between patterned features located on different layers of the wafer. The method also includes measuring a characteristic of a feature or a portion of a feature on the wafer using atomic force microscopy, as shown in step 98. In one embodiment, the feature may be one of the patterned features that is measured to determine overlay. In another embodiment, atomic force microscopy may be used to measure the characteristic of each of the patterned features located on each of the different layers that are measured to determine overlay.

In one embodiment, the feature or the portion of the feature that is measured by the AFM may be located at a first position on the wafer. In one such embodiment, the method may include measuring the overlay at a second position on the wafer spaced from the first position. In another such embodiment, the method may include measuring the characteristic of the feature with the AFM at the first position while measuring the overlay at the second position.

In some embodiments, the method may also include altering the overlay measurement using the characteristic, as shown in step 100. The overlay measurement may be altered as described above. In additional embodiments, the method may include validating the overlay measurement using the characteristic, as shown in step 102. The overlay measurement may be validated as described above. Each of the embodiments of the method described above may also include any other step(s) described herein.

An additional embodiment relates to a method that includes measuring overlay of a wafer using an AFM. The AFM may be configured as described above. As also described above, overlay is a measure of misalignment between patterned features located on different layers of the wafer. In one particular example, the AFM may be used to measure overlay of the patterned features instead of using an optical subsystem to measure the overlay. In this manner, an AFM may completely replace the optical subsystem of an overlay measurement system. The method also includes measuring a characteristic of at least one of the patterned features or a portion of at least one of the patterned features on the wafer using the AFM. The method may also include any other steps described herein.

Further modifications and alternative embodiments of various aspects of the invention may be apparent to those skilled in the art in view of this description. For example, methods and systems for analyzing a specimen using atomic force microscopy profiling in combination with an optical technique are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system, comprising:
an optical subsystem configured to generate positional information about a location on a surface of a specimen; and
an atomic force microscopy probe, wherein the system is configured to position the probe proximate the location based on the positional information, wherein the positional information comprises a z position for the probe generated by the optical subsystem based on three-dimensional information about the surface of the specimen generate by the optical subsystem, and wherein the system is further configured to position the probe proximate the location by placing the probe at a z position a spaced distance from the location based on the z position for the probe generated by the optical subsystem.

2. The system of claim 1, wherein the optical subsystem and the probe are arranged within one housing.

3. The system of claim 1, wherein the optical subsystem and the probe are separate tools coupled by a transmission medium.

4. The system of claim 1, further comprising a servo subsystem configured to receive the positional information from the optical subsystem and to move the probe to the location.

5. The system of claim 1, wherein the positional information further comprises x and y coordinates of the location.

6. The system of claim 1, wherein the optical subsystem is further configured to generate the three-dimensional information about the location on the surface of the specimen, and wherein the system is further configured to position the probe the spaced distance from the location on the surface of the specimen based on the three-dimensional information.

7. The system of claim 1, wherein the optical subsystem is further configured to generate images of the surface of the specimen, wherein the system comprises a graphical user interface configured to display the images and a user input device, and wherein a user can use the user input device to select the location based on the images displayed on the graphical user interface.

8. The system of claim 1, wherein the optical subsystem comprises a coherence probe microscope.

9. The system of claim 1, wherein the optical subsystem comprises an inspection system, a defect review system, or a defect dispositioning system.

10. The system of claim 1, wherein the optical subsystem comprises an inspection system, and wherein the location corresponds to a location of a defect detected on the surface of the specimen by the inspection system.

11. The system of claim 1, wherein the optical subsystem comprises a defect review system, and wherein the location corresponds to a location of a defect identified by the defect review system for analysis with the probe.

12. A method, comprising:
generating positional information about a location on a surface of a specimen with an optical subsystem; and
positioning an atomic force microscopy probe proximate the location based on the positional information, wherein the positional information comprises a z position for the probe generated by the optical subsystem based on three-dimensional information about the surface of the specimen generated by the optical subsystem, and wherein said positioning comprising positioning the probe proximate the location by placing the probe at a z position a spaced distance from the location based on the z position for the probe generated by the optical subsystem.

13. The method of claim 12, further comprising generating the three-dimensional information about the location on the surface of the specimen with the optical subsystem and positioning the probe the spaced distance from the location on the surface of the specimen based on the three-dimensional information.

14. The method of claim 12, further comprising generating images of the surface of the specimen with the optical subsystem and displaying the images to a user such that the user can select the location using the images.

15. The method of claim 12, further comprising inspecting the specimen with the optical subsystem, wherein the location corresponds to a location of a defect detected on the specimen.

16. The method of claim 12, further comprising reviewing defects detected on the specimen with the optical subsystem, wherein the location corresponds to a location of one of the defects identified for further analysis with the probe.

* * * * *